US005637944A

United States Patent [19]

Shimoyama

[11] Patent Number: 5,637,944

[45] Date of Patent: Jun. 10, 1997

[54] FLAT DISK COMMUTATOR

[75] Inventor: Syuji Shimoyama, Kasakakemachi, Japan

[73] Assignee: Mitsuba Electric Manufacturing Co., Ltd., Gunma, Japan

[21] Appl. No.: 421,668

[22] Filed: Apr. 12, 1995

[30] Foreign Application Priority Data

Apr. 25, 1994 [JP] Japan .................................... 6-109001

[51] Int. Cl.[6] .......................... H01R 39/06; H02K 13/04

[52] U.S. Cl. ............................ 310/237; 310/233; 29/597

[58] Field of Search .................................. 310/237, 233; 29/597

[56] References Cited

U.S. PATENT DOCUMENTS

| | | | |
|---|---|---|---|
| 3,958,141 | 5/1976 | Bowcott | 310/237 |
| 4,453,102 | 6/1984 | Sawabe et al. | 310/237 |
| 5,157,299 | 10/1992 | Gerlach | 310/237 |
| 5,175,463 | 12/1992 | Farago et al. | 310/231 |
| 5,255,426 | 10/1993 | Farago et al. | 29/597 |
| 5,386,167 | 1/1995 | Strobl | 310/237 |
| 5,400,496 | 3/1995 | Kemmer et al. | 29/597 |
| 5,442,849 | 8/1995 | Strobl | 29/597 |

*Primary Examiner*—Steven L. Stephan
*Assistant Examiner*—Elvin G. Enad
*Attorney, Agent, or Firm*—McCormick, Paulding & Huber

[57] ABSTRACT

It is an object of the present invention to provide a commutator in which the making of the plate solder can be omitted.

A segment 21 is arranged at one end face of the axial direction of the boss 16 with an equal spacing and is fixed in an insulating manner. Each riser bar 4 is electrically connected to each segment. Each connecting plate 6 is continuously provided at each riser bar 4. A recess 5 formed at each connecting plate 6 is engaged at a projection 10 formed at the outer circumference of each ring solder 12. Each connecting plate 6 is arranged on the outer circumferential face of each segment, which is thereby electrically connected by a solder layer 13. A boss 16 surrounds each connecting plate 6 from the outside thereof in a state which makes each riser bar 4 project.

6 Claims, 3 Drawing Sheets

FLAT DISK COMMUTATOR

BACKGROUND OF THE INVENTION

1. Field of the Invention

This invention relates to a commutator, and more particularly to a flat disk commutator in which a segment is arranged on one end face in axial direction of a boss and in a circumferential direction of the boss, which is effectively employed, for instance, in an "In-Tank Type Fuel Feed Pump" in which a motor is integrated with a pump.

2. Related Art Statement

In general, as a fuel feed pump for feeding a fuel to a vehicle such as an automobile, an "In-Tank Type Fuel Feed Pump" in which a motor is integrated with a pump, which is provided in a fuel tank, has been proposed. In an "In-Tank Type Fuel Feed Pump", a "Flat Disk Type Commutator" is employed as a motor.

One the other hand, an "In-Tank Type Fuel Feed Pump" is generally constructed so that a fuel can be fed from a pump to the outside through a motor housing. In this case, the fuel touches to the commutator of the motor.

By the way, in the case of use of gasohol in which alcohol is mixed with the gasoline as fuel, when copper of the commutator which is used in the motor of the fuel feed pump contacts with the gasohol, the fuel is altered, or the copper is penetrated. Hence, a commutator for gasohol is proposed in, for example, U.S. Pat. No. 5,175,463. In this patent, a protecting portion chip(s) made from carbon is(are) attached, by soldering, to at least one surface contacting a brush in a copper of a base member of a segment (commutator bar). When manufacturing such commutator, a plate solder formed into an end face of a carbon protecting portion chip is prepared, the plate solder is inserted between the carbon protecting portion chip and copper main material, and is soldered therebetween.

However, the above manufacturing method for a commutator as described hereinbefore, the dedicated solder plate which is special form have to be made, so that the manufacturing cost increase.

SUMMARY OF THE INVENTION

It is an object of the present invention to provide a commutator which can omit to make the plate solder.

So as to satisfy these objects, the present invention provides a commutator comprising:

a boss made from resin, which is unitarily formed into disk-shape; a plurality of carbon segments arranged on an end surface of the axial direction of the boss with an equal spacing in circumferential direction of the boss, which are insulated from each other; and a plurality of riser bars, which are electrically connected to each segment respectively; wherein:

each of the riser bars is connected to a connecting plate;

a recess formed at each of the connecting plates, which is respectively engaged to each projecting portion formed at outer circumference of the carbon segment;

each of the connecting plates is arranged to the outer circumference of the carbon segment and is electrically connected; and the boss, in a state to make each riser bar project, surrounds a part of each connecting plate from outside thereof.

Further, the connecting plate integrated with a unitary riser bar is electrically connected to a side face of the carbon segment by a soldering.

Furthermore, the connecting plate integrated with a unitary riser bar is electrically connected to a side face of the carbon segment by a conductive adhesive.

According to the commutator described hereinbefore, the connection chip connected to the riser bar is electrically connected to the carbon segment at the side face thereof, so that it is unnecessary to touch the plate solder on the end face of the carbon segment. That is, to make the plate solder corresponding to the end face shape of the carbon segment is unnecessary, so that the manufacturing cost can be decreased.

As described hereinbefore, according to the present invention, since the connection chip connected to the riser bar is electrically connected to the carbon segment with the side face thereof, the manufacturing cost can be decreased and the segment and the riser bar can be strongly integrated with each other.

DESCRIPTION OF THE PREFERRED EMBODIMENT

Figure 1A:
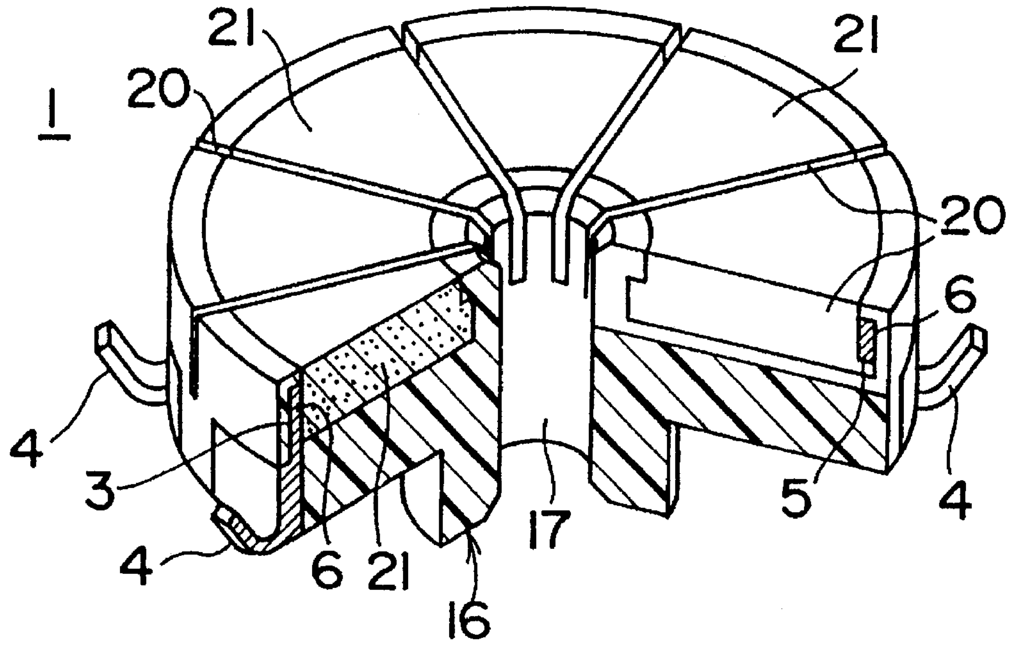
FIG. 1(*a*) is a fragmentary sectional perspective view showing a commutator in accordance with the first embodiment of the present invention, FIG. 1(*b*) is a fragmentary enlarged sectional view showing a riser bar of the commutator, FIG. 1(*c*) is a fragmentary sectional front view showing a projection of the commutator.

In this embodiment, a commutator according to the present invention is constructed as a "flat disk type" and to be employed in a motor in an "in tank type fuel feed pump".

A flat disk type commutator 1 according to the embodiment comprises: a boss 16 which is formed into an approximately thick disk-shape; a plurality of segments 21, each of which is formed into an approximate sector, which are radially arranged on the surface of the boss 16 with an approximately equal spacing; a riser bar 4 which is electrically connected to each segment 21, as a conductive base material; and slits 20 for insulating adjacent segments 21 from each other. A shaft hole 17 is opened at the boss 16 for fixing a motor shaft by passing it therethrough.

Each segment 21 is formed by a baking work from carbon powder with an appropriate binder, in this embodiment, as described hereinafter, a carbon plate 8 which is a circular ring plate shape is formed into an approximately fan shape divided by slits 20. A connecting plate 6 is continuously integrated with each riser bar 4, which is soldered to a side face of the segment 21. A step 3 is unitarily formed at a half of an upper side of an outer circumference of the connecting plate 6 integrated with the unitary riser bar 4. A part of the boss 16 is formed at the outside of the step 3 in an engaging state. Recesses 5, 5 are formed at both ends of each connecting plate 6 in a circumferential direction thereof, a projection 10 of the segment 21 and a part of the boss 16 are engaged to each recess 5. Further, an inside engaging portion 18 of the boss 16 is shapely connected to an inside step 9 of the segment 21. Hence, each connecting plate 6 and the segment 21 are in a state to be mechanically connected to each other.

Figure 2:
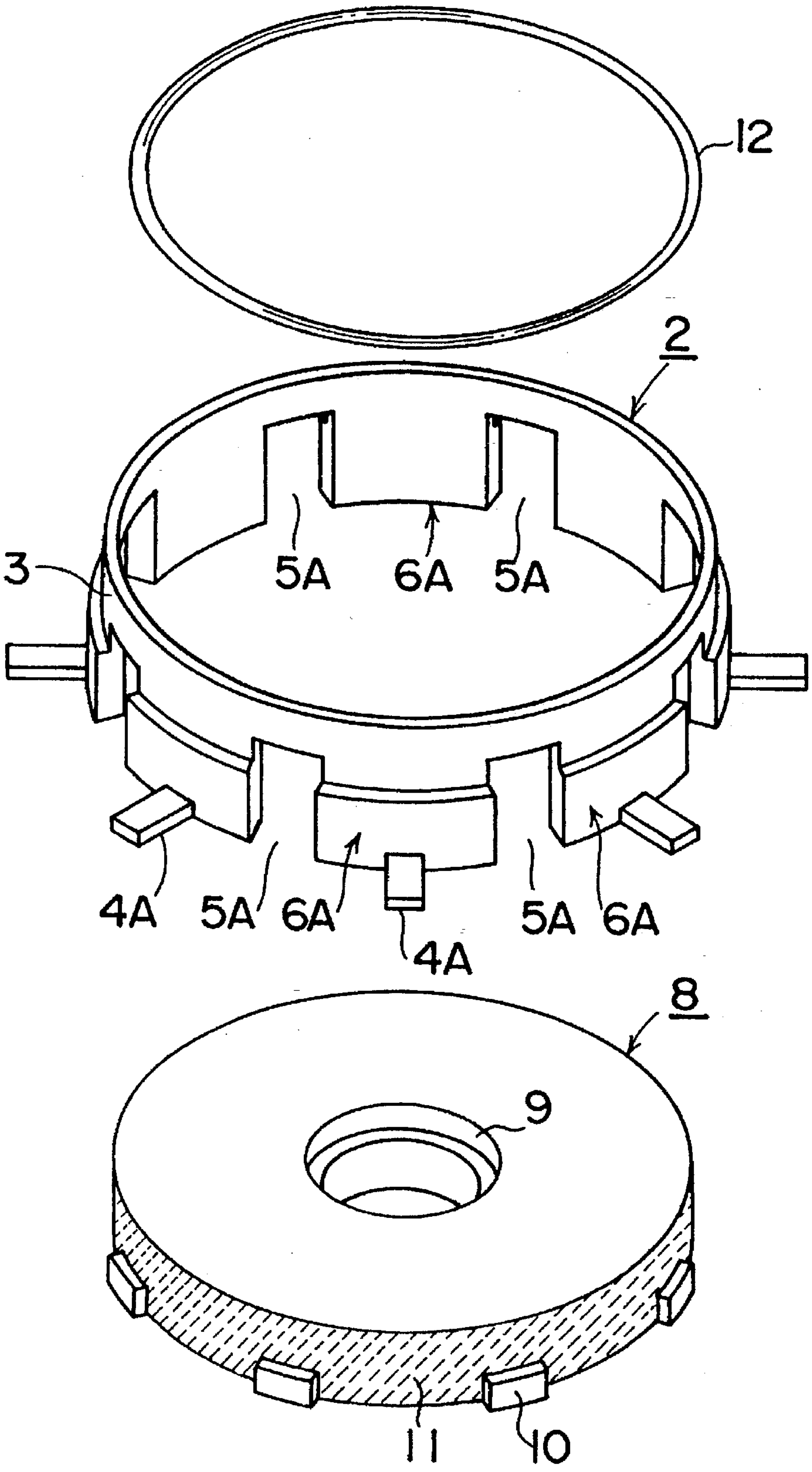
FIG. 2 is an exploded perspective view showing the commutator in the manufacturing process, FIG. 3(*a*) is a front sectional view showing the manufacturing step before soldering, FIG. 3(*b*) is a front sectional view showing the manufacturing step after soldering, FIG. 3(*c*) is a front sectional view showing the manufacturing step after a boss is formed.

In this embodiment, the segment 21 is formed by the carbon plate 8 as shown in FIG. 2. The carbon plate 8 is made from carbon powder with a suitable binder by a baking work, which is formed into a plate body of a circular shape. The carbon plate 8 is formed into a large width circular ring plate having a width which is equal to the measure in a diametrical direction of the segment which may be manufactured. That is, the carbon plate 8, which is formed into a circular ring plate having a large width, is formed so that the outer diameter thereof is approximately equal to an outer diameter of the group of segments and the inner diameter thereof is approximately equal to the inner diameter of the group of segments.

The inside steps 9 are respectively formed, with a constant width and height, at an inside circumferential face of one end face (hereinafter, called an "upper face") of the carbon plate 8. The inside step 9 is set to the optimum width and height thereof so as to be able to integrate the boss and each carbon segment with each other in an engaging state to a part of the boss after the boss is formed by a resin forming as described herein after.

Further, the projection 10, is the same in number ("8" in this embodiment) as the segment, and is projectingly provided so as to be an arc plate shape with a constant height, width and thickness at an outside face of the carbon plate 8 by being arranged with an equal spacing in circumferential direction in the side of the lower end face of the opposite side of the end face on which the inside step 9 is formed. The width in circumferential direction and the thickness in axial direction of the projections 10, 10 are set to be approximately equal to the width in circumferential direction of the engaging recess of a riser bar as described hereinafter and the thickness of a step portion. A height of the projection 10 is set to be approximately equal to the height projecting from the engaging recess of the riser bar.

Further, a nickeling coat 11 is formed on the outside face of the carbon plate 8. As described hereinafter, the nickeling coat 11 is an example of a surface finishing means for being able to solder on the carbon plate. Thus, it is possible to be attached to carbon, other than nickel, and it is also possible to form from metal material or non-metal material. Such a coat is not limited to a plating, it is possible to be formed by an evaporation process, a painting process and the like.

In this embodiment, the group of riser bars and the group of terminals are formed from a cylinder body 2 as shown in FIG. 2. The cylinder body 2 is unitarily formed from copper series material (copper or copper alloy) into a short circular cylinder shape by a press working. An inside diameter of the cylinder body 2 is set to a diameter which is a little larger than the outside diameter of the carbon plate 8. A step 3 is formed at half side (hereinafter, called an "upper side") area of the outer circumference of the cylinder body 2.

A riser bar portion 4A, which can be the riser bar 4, is unitarily provided in a projecting manner at the end of the lower side of the cylinder body 2 with an equal spacing in the circumferential direction, outward of the diametrical direction, and the same number ("8" in this embodiment) as the segment. The riser bar portion 4A is formed into a small rectangular chip, the scale of which can be worked by fusing, in a state to put a coil end portion of the armature coil therebetween. A top end portion of the riser bar portion 4A is suitably bent so as to incline upwardly in order to improve the putting operation of the coil end portion and fusing operation.

A notch 5A, which can be the recess 5, is arranged between adjacent riser bar portions 4A, 4A, is the same number ("8" in this embodiment) as the riser bar portion 4A, and is notched from the lower side of the riser bar portion 4A. The width of the notch 5A is set to the approximate width of the projection 10 in the circumferential direction. A connecting plate portion 6A, which can be the connecting plate 6, is respectively formed by a substantial part between adjacent notches 5A, 5A.

Figure 3A:
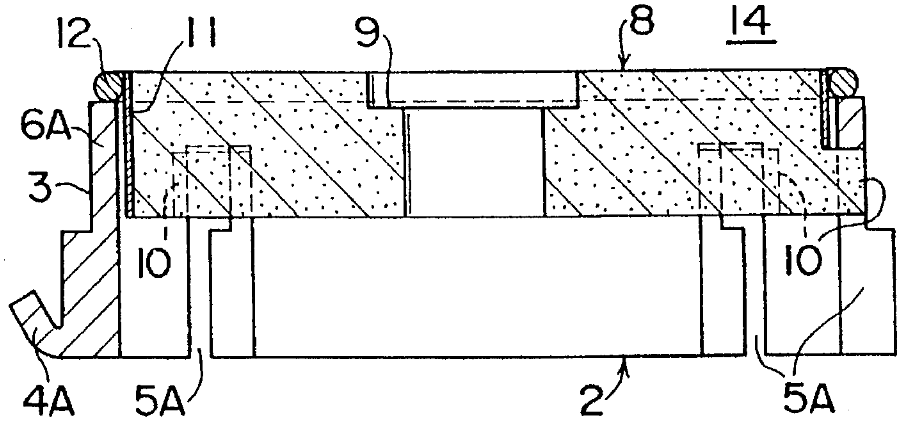
Figure 3B:
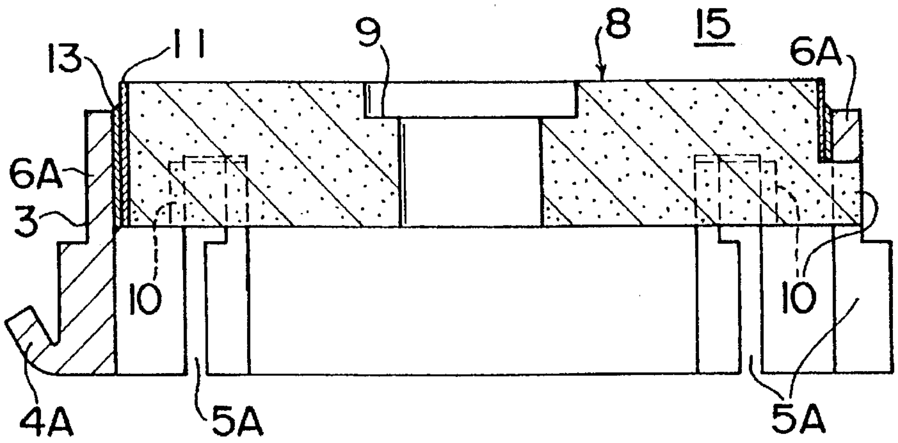
Figure 3C:
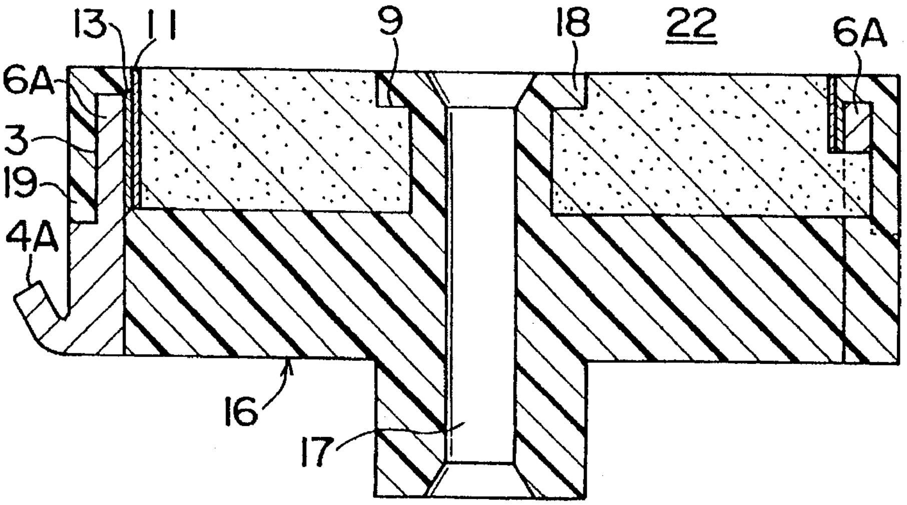

The carbon plate 8 described as above is inserted in the cylinder body 2 so as to be as shown in FIG. 3(*a*). Then, each projection 10 of the carbon plate 8 is respectively inserted in each notch 5A of the cylinder body 2. In this state, the upper face of the carbon plate 8 is in a state to barely protrude upward from upper end face of the cylinder body 2. The ring solder 12 is fitted in a loose manner at the outer circumference of the protruding end portion from the cylinder body 2 of the carbon plate 8. The ring solder 12 is formed by simply rounding a common line like solder into a ring shape. Hence, the cost is not really increased at all.

After that, when the assembly 14 comprising the cylinder body 2, the carbon plate 8 and the ring solder 12 is heated by a soldering iron, a heating furnace and the like, the ring solder 12 is melted, the solder in fluid state permeates between fitting faces of the cylinder body 2 and the carbon plate 8 by capillary phenomena and is hardened, so that, as shown in FIG. 3(*b*), the solder layer 13 is formed between the cylinder body 2 and the carbon plate 8. Then, the nickeling coat 11 is formed at the outer circumferential surface of the carbon plate 8, so that the solder layer 13 is in a state to connect the carbon plate 8 and cylinder body 2, electrically and mechanically.

The boss 16 is, as shown in FIG. 3(*c*), resin formed at the combination 15 in which the cylinder body 2 and the carbon plate 8 are combined by the solder layer 13. That is, the boss 16 is unitarily formed at the lower end face of the opposite side of the inside step 9 of the carbon plate 8 by a press forming method (molding method) using a resin having an insulating material. The shaft hole 17 is opened on the center line of the boss 16 by a forming into a hole like shape of the circular column, simultaneously.

The outer circumference of the lower portion of the carbon plate 8 of the boss 16 is in a surrounding state, the step 3 of the cylinder body 2 is filled with the resin through the notch 5A provided in a cutting manner at the cylinder body 2, and is integrated with a unitary step 3 in a surrounding state. The inside engaging portion 18 and an outside engaging portion 19 are formed at the inside and outside of the upper side of the carbon plate 8 of the boss 16. The inside engaging portion 18 is in a state to connect with inside step 9 formed at the carbon plate 8. The outside engaging portion 19 is in a state to engage the step 3 formed at the outer circumference of the cylinder body 2. By this connecting with each other, the carbon plate 8 is in a state to be kept so as to not come out by the boss 16.

The portion filled at the lower portion of each notch 5A of the cylinder body 2 of the boss 16 is in a state to engage with the notch 5A, so that the boss 16 and the cylinder body 2 are respectively in a stopped state. The notch 5A of the cylinder body 2 and each projection 10 of the carbon plate 8 are in a fitted state, the cylinder body 2 and the carbon plate 8 are in a stopped state.

Figure 1B:
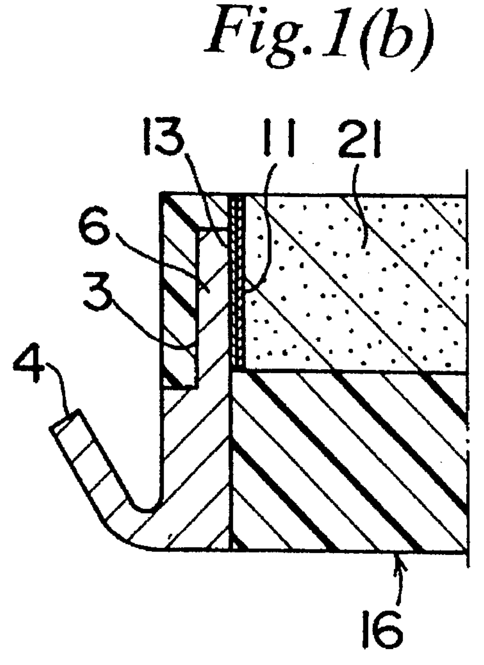
Figure 1C:
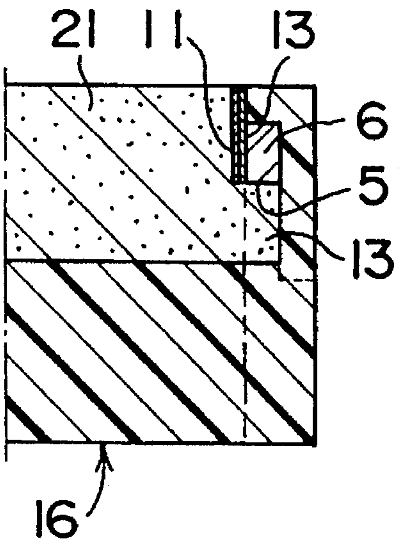

After that, each riser bar portion 4A is folded into a letter "V" shape. Next, a slit is worked in a cutting manner at the carbon plate 8 and a part of the boss 16. By the above steps, the flat disk type commutator 1 according to the above construction shown in FIG. 1 has been manufactured. That is, a plurality of slits 20 is arranged to each notch 5A of the cylinder body 2, which is at the middle portion between adjacent riser bar portions 4A, 4A, and is provided in a cutting manner so as to correspond to the normal line by suitable means such as a cutter. The slit 20 separates the carbon plate 8 by cutting to the boss 16, each segment 21 is substantially constructed, adjacent segments thereof are electrically independent from each other. Namely, each segment 21 is constructed of a carbon plate chip separated from each other by the slit 20. Adjacent connecting plate portions 6A, 6A of the cylinder body 2 are separated by the slit 20, each connecting plate 6 is thereby formed, which is electrically connected to each segment 21 by the side face by the solder layer 13. Each connecting plate 6 is connected to the boss 16 and each segment 21 in the step 3 and each recess 5 constructed by separating the notches 5A, 5A by the slit 20.

The advantages hereinafter are obtained by the above embodiment.

(1) Since manufacturing the special plate solder is unnecessary, it is possible to prevent an increase in cost.

(2) Since the projecting portion of both sides of the carbon plate and the recess of the connecting plate are connected to each other, and resin of the boss is continuously formed into a ring shape at the step of the connecting chip, the segment and the riser bar are fixed to each other, strongly, with the soldered layer.

The present invention is not limited to these embodiments; in so far as the essence of the invention is not deviated from, it goes without saying that the present invention can be modified.

For instance, the method for connecting the connecting plate and the carbon segment is not limited to a soldering, it is possible to use a conductive adhesive.

The cylinder for constructing the riser bar and the connecting plate is not limited to a circular cylinder, it is possible to be formed into an approximate polygon cylinder.

The slip out toward the axial direction can be secured by the step formed at the outer circumference of the connecting plate, the upper face of the segment and the upper face of the connecting plate can be made to correspond with each other.

In the above embodiment, each segment 21 is electrically separated by the slit 20 between adjacent segments 21, 21. Beforehand, a plurality of segments formed into an arc-like shape, is arranged into circular ring shape through a gap, it is hereby possible to form in an inserting manner at the boss 16.

What is claimed is:

1. A commutator, comprising:

a unitary disk-shaped boss made from resin, said boss having an axially facing upper end face and a circumferential direction;

a plurality of carbon segments arranged on said end face of said boss and spaced from one another by an equal spacing in said circumferential direction of said boss, which segments are insulated from each other and each of which segments has a radially outwardly facing circumferential surface having upper and lower edges; and a plurality of riser bars, each of which riser bars is electrically connected to a respective one of said segments; wherein:

each of said segments has a projection extending radially outwardly from its radially outwardly facing circumferential surface;

each of said riser bars is connected to a connecting plate;

a recess is formed in each of said connecting plates and receivingly engages said projection extending radially outwardly from the radially outwardly facing circumferential surface of an associated one of said segments;

each of said connecting plates is arranged on said outer circumferential surface of a respectively associated one of said segments and extends along a substantial portion of the distance between said upper and lower edges of said associated segment and has an inner circumferential surface electrically connected to said outer circumferential surface of said respectively associated one of said segments; and said boss has a circumferential portion extending axially upwardly from said upper end face of said boss, from which said riser bars project radially outwardly, which boss portion radially overlies and circumferentially surrounds parts of all of said connecting plates.

2. The commutator according to claim 1, wherein said inner circumferential surface of each of said connecting plates is electrically connected to the outer circumferential surface of the associated one of said segments by soldering.

3. The commutator according to claim 1, wherein said inner circumferential surface of each of said connecting plates is electrically connected to the outer circumferential surface of the associated one of said segments by a conductive adhesive.

4. The commutator according to claim 1, wherein a conductive layer is formed on said outer circumferential surface of each of said segments.

5. The commutator according to claim 4, wherein said inner circumferential surface of each of said connecting plates is electrically connected to said conductive layer of the associated one of said segments by soldering.

6. The commutator according to claim 4, wherein said inner circumferential surface of each of said connecting plates is electrically connected to said conductive layer of the associated one of said segments by a conductive adhesive.

* * * * *

UNITED STATES PATENT AND TRADEMARK OFFICE

CERTIFICATE OF CORRECTION

PATENT NO. : 5,637,944

DATED : June 10, 1997

INVENTOR(S) : Syuji Shimoyama

It is certified that error appears in the above-indentified patent and that said Letters Patent is hereby corrected as shown below:

On the title page, items

[75] Inventor: Syuji Shimoyama, Gunma, Japan

[73] Mitsuba Corporation

Signed and Sealed this

Ninth Day of December, 1997

Attest:

BRUCE LEHMAN

Attesting Officer

*Commissioner of Patents and Trademarks*